June 8, 1926.  
J. R. DUNCAN  
1,587,514  
APPARATUS FOR LOCATING AND ATTACHING CABLES TO SUNKEN VESSELS  
Filed Feb. 21, 1925  
4 Sheets-Sheet 1

WITNESSES  
INVENTOR  
John R. Duncan  
HIS ATTORNEY

WITNESSES:

INVENTOR
John R. Duncan
BY
Joshua R.H.Potts
HIS ATTORNEY

June 8, 1926. 1,587,514
J. R. DUNCAN
APPARATUS FOR LOCATING AND ATTACHING CABLES TO SUNKEN VESSELS
Filed Feb. 21, 1925 4 Sheets-Sheet 3
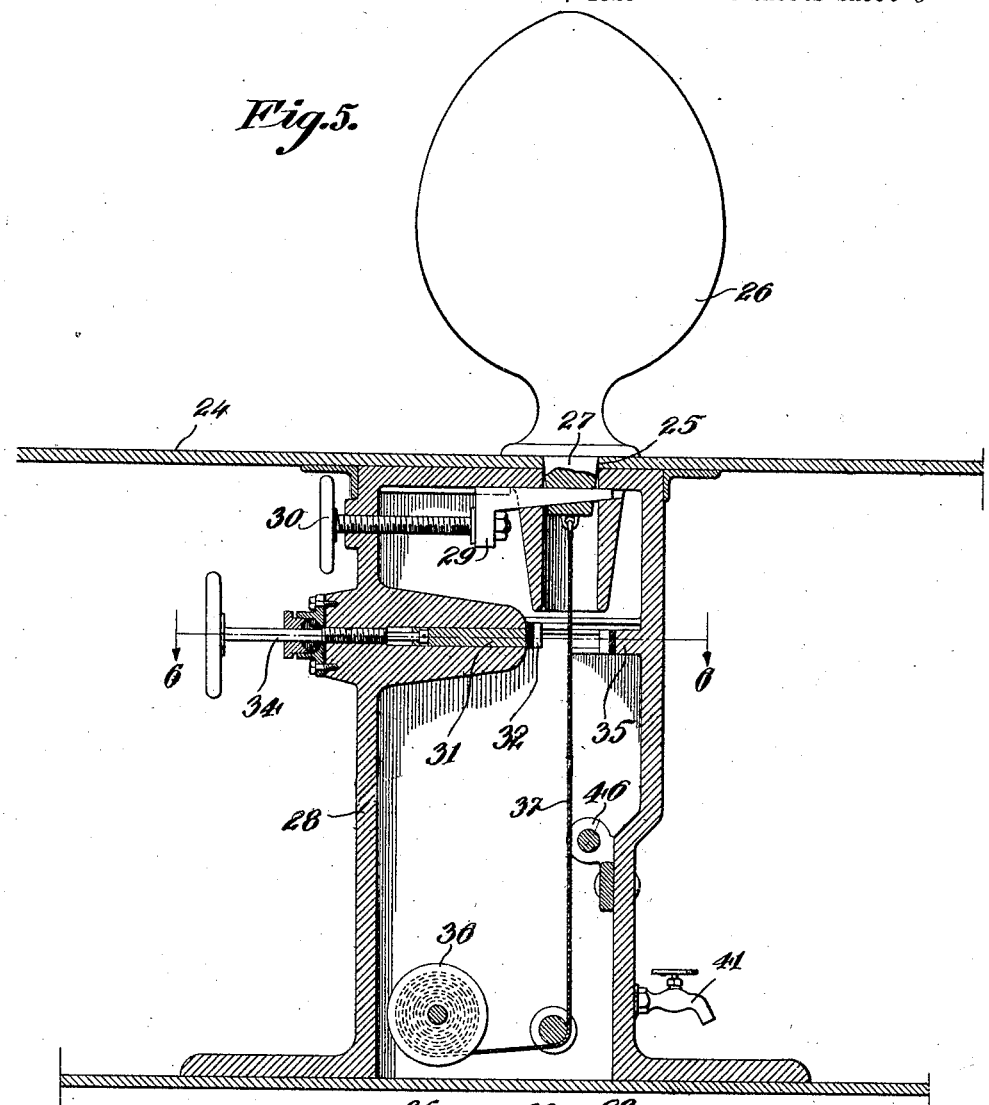
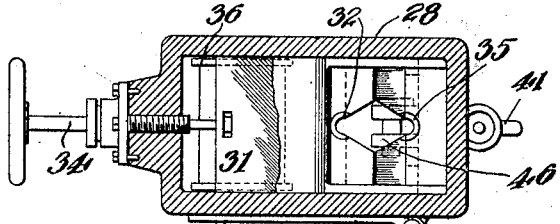
WITNESSES:
Virgil L. Mares
George A. Gruss
INVENTOR
John R. Duncan
BY
Joshua R. H. Potts
HIS ATTORNEY June 8, 1926.
J. R. DUNCAN
1,587,514
APPARATUS FOR LOCATING AND ATTACHING CABLES TO SUNKEN VESSELS
Filed Feb. 21, 1925    4 Sheets-Sheet 4
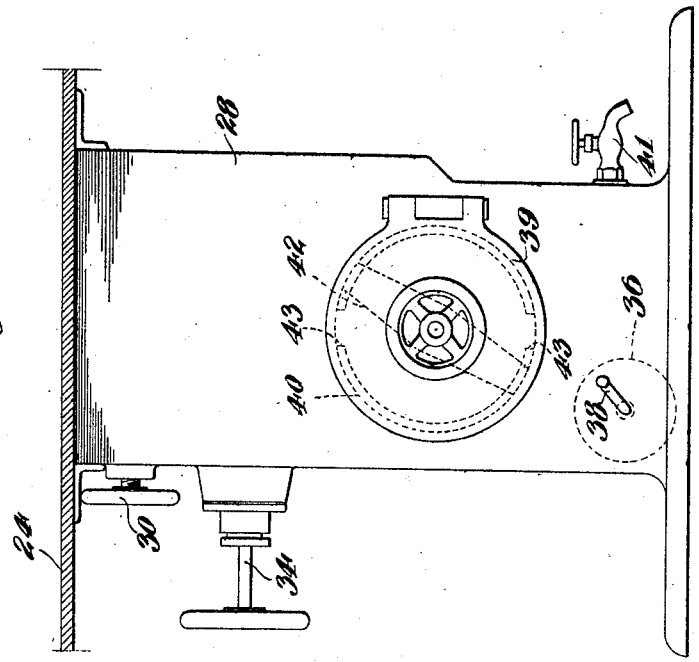
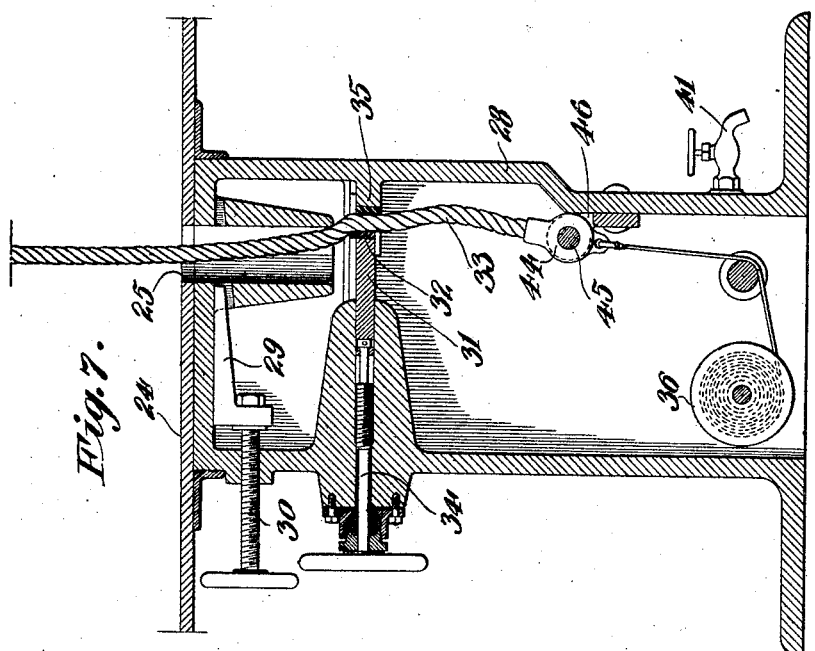
WITNESSES:
INVENTOR
John R. Duncan
BY
Joshua R. H. Potts
HIS ATTORNEY Patented June 8, 1926.

1,587,514

UNITED STATES PATENT OFFICE.

JOHN R. DUNCAN, OF ARDMORE, PENNSYLVANIA.

APPARATUS FOR LOCATING AND ATTACHING CABLES TO SUNKEN VESSELS.

Application filed February 21, 1925. Serial No. 10,945.

My invention relates to apparatus for marking the location of sunken vessels and for anchoring hoisting or towing cables thereto.

The objects are to provide apparatus which, in case a vessel sinks, will serve to mark the place where it sunk, and to which hoisting or towing cables from salvaging vessels may be anchored whereby the sunken vessel may be raised and reclaimed.

Figure 1:
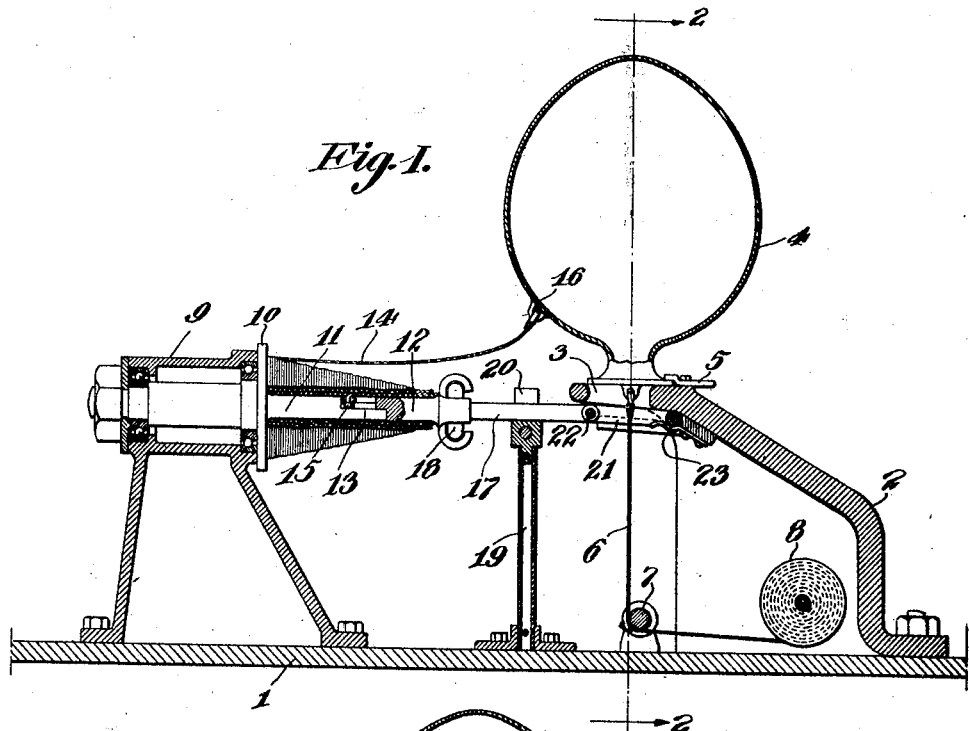
Figure 2:
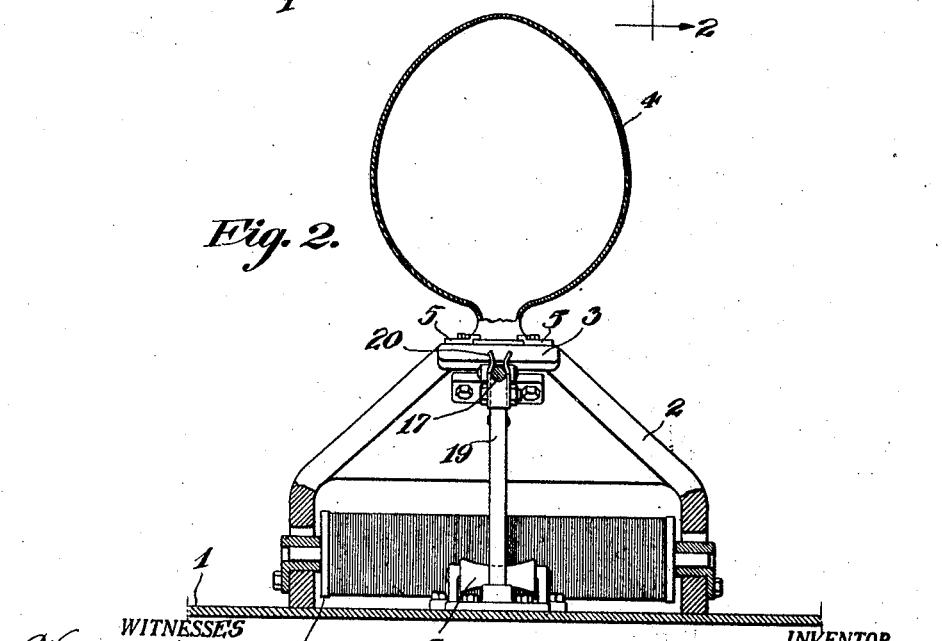

These objects, and other advantageous ends which will be described hereinafter, I attain in the following manner, reference being had to the accompanying drawings in which Figure 1 is a central vertical section through apparatus embodying my invention illustrating it as secured to the deck of a ship, Figure 2 a section on line 2—2 of Figure 1, Figure 3 a view similar to Figure 1, illustrating the parts in another position.

Figure 3:
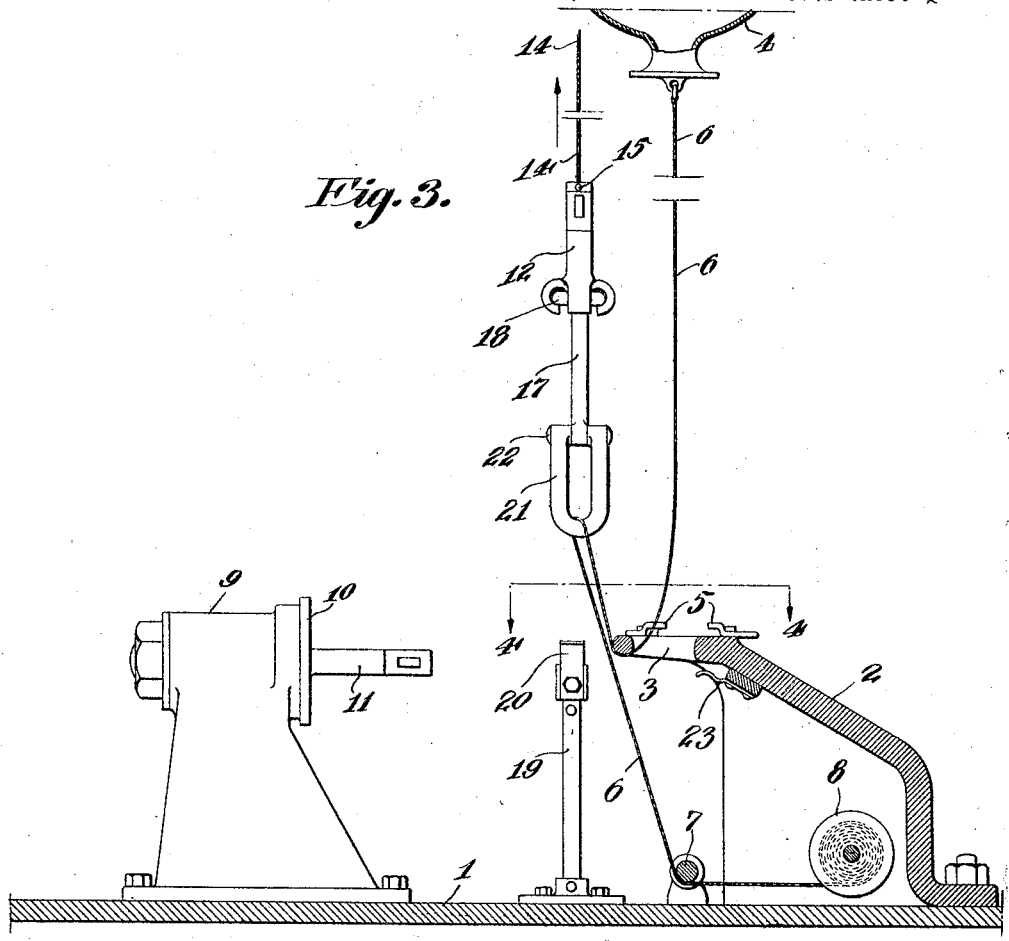
Figure 4:
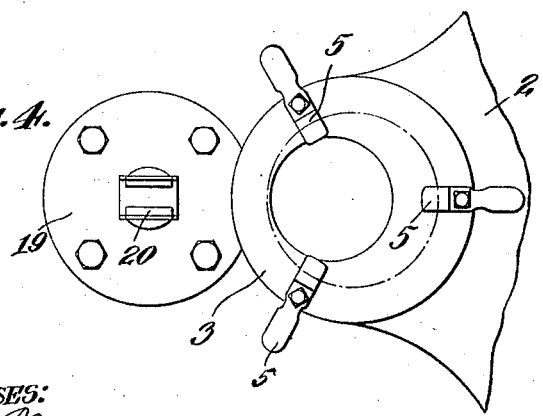

Figure 4 a fragmentary enlarged section on line 4—4 of Figure 3,

Figure 5 a central section through a modified form of apparatus adapted for use with a submarine, Figure 6 a section on line 6—6 of Figure 5, Figure 7 a view similar to Figure 5 illustrating the parts in another position, and Figure 8 a front outside view of the parts shown in Figure 5.

Referring to Figures 1-4 of the drawings, 1 indicates the deck of a ship; 2 a cable-anchoring member having a fixed loop 3; 4 a float mounted on the member over the loop and detachably fastened thereto by suitable wedging levers 5; 6 a cable, hereinafter called a float cable, connected to the lower end of the float and passing downwardly through the loop, then under a pulley 7 and onto a reel 8 rotatable on member 2; 9 a spool support secured to the deck; 10 a spool rotatable in the support; 11 a spindle on the spool; 12 a spindle section adapted to interlock with spindle 11 as shown at 13; 14 a cable, hereinafter called a loop cable, wound around section 12 and spindle 11 thereby holding them interlocked and having one end fastened to section 12 at 15 and the other end fastened to the side of the float 4 at 16; 17 a rod rotatably connected with spindle section 12 at 18; 19 a standard secured to the deck and having a spring clip 20 for holding rod 17; and 21 a loop embracing float cable 6, hinged to rod 17 at 22 and held under loop 3 by a spring clip 23 on member 2.

In case of danger of sinking, the person assigned to release float 4 from the anchoring member 2, may do so by swinging wedging levers 5 out of holding engagement with float 4. As the ship sinks, float 4 will remain on or near the surface of the water. Float cable 6, will unwind from reel 8 and pass through loop 3. Loop cable 14, fastened to the side of float 4, will be unwound from spool 10. Cables 6 and 14, being longer than the depth to which the ship sinks, allow float 4 to remain on the surface of the water after the ship has sunk. The float will thus serve to mark the location of the sunken ship.

To anchor a towing or hoisting cable to the sunken ship, the towing cable is fastened to float cable 6 which is then disconnected from the lower end of the float. Loop cable 14, connected to the side of float 4, is then pulled up until it is unwound from spindle 11 and spindle section 12. A further pulling of cable 14 will disconnect section 12, having the end of cable 14 fastened thereto, from spindle 11, lift rod 17 out of spring clip 20, and slip loop 21 out of spring clip 23. Float cable 6, being within loop 21, will be pulled through loop 3 of the cable anchoring member 2, as shown in Figure 3. A continued upward pulling of loop cable 14 and loop 21, will cause float cable 6 to pull the towing or hoisting cable downward through loop 3, and up to the surface of the water, after which the hoisting cable may be fastened for towing or hoisting purposes.

Referring to Figures 5-8, 24 indicates the deck of a submarine having an opening 25; 26 a float resting on the deck and having a lug 27 depending into the opening; 28 a casing secured to the deck within the submarine and sealed to be water tight; 29 a locking wedge slidable in casing 28 and adapted to pass through lug 27 to lock float 26 to the deck 24; 30 a screw in the casing for moving the wedge into and out of holding position; 31 a gate slidable in the casing and having a jaw 32 lined with rubber or other resilient material which when pressed around a towing or hoisting cable 33 will make a water tight seal; 34 a screw in the casing for moving the gate; 35 a jaw similar to jaw 32, secured in the casing; 36 a reel rotatable in the casing; 37 a cable connected to lug 27 and wound around and fastened to the reel; 38 a crank connected with the reel for winding cable 37 thereon; 39 a door for closing and sealing an entrance 40 to casing 28; and 41 a spigot for allowing the water within casing 28 to run out for the purpose of attaching the towing cable within the casing.

If for any reason, the submarine fails to rise, its location may be indicated by releasing float 26. This is done by first turning screw 30 to move wedge 29 out of lug 27. Reel 36 is then turned by manipulating crank 38 to unwind cable 37 and allow float 26 to rise to the surface of the water. The location of the submarine is thus easily determined by float 26.

To connect the towing or hoisting cable 33 to the submarine, the cable is fastened to float cable 37 which is then disconnected from lug 26 of the float. Reel 36 is then turned by manipulating crank 38 to wind float cable 37 and pull the towing or hoisting cable 33 through opening 25 into the casing. Gate 31 is then closed by turning screw 34 so that the rubber lined jaw 32 on the gate and jaw 35 on the casing will embrace cable 33 and form a water tight seal as shown in Figure 7. The water in casing 28, under the gate 31, is then allowed to run out by opening spigot 41. Door 39 is then opened by turning the locking bar 42 into registry with the notches 43 in the casing and swinging the door open. The connecting end of the towing cable 33 may be provided with an eye 44 which is connected by a pin 45 to a pair of lugs 46 secured to casing 28. Door 39 is then closed and locked by bar 42 and gate 31 is opened by turning screw 34. The submarine may then be raised or towed to shallow water by the cable 33.

It will be seen that with the apparatus above described sunken vessels may be easily located and towing or hoisting cables connected thereto and the vessels raised from any depth without requiring divers and special diving apparatus.

While I have described my invention as taking a particular form, it will be understood that the various parts may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:—

1. Apparatus of the character described including a cable anchoring member fixed to the vessel and having stationary means thereon; a reel rotatable in the anchoring member; a cable wound on the reel and movable through said stationary means; a float connected with said cable; means movably embracing said cable between said stationary means and the reel; and means connected with said cable means and float.

2. Apparatus of the character described including a cable anchoring member fixed to the vessel and having a fixed loop; a reel rotatable in the anchoring member; a cable fixed to and wound on the reel and taking through the loop; a float connected with the cable; a movable loop embracing the cable below the fixed loop, and a second cable connected with the movable loop and the float.

3. Apparatus of the character described including a cable anchoring member fixed to the vessel and having a fixed loop; a reel rotatable in the anchoring member; a cable fixed to and wound on the reel and taking through the loop; a float connected with the cable; a spool mounted on the vessel; a member detachably connected with the spool and carrying a loop embracing the cable below the fixed loop, and a second cable connected with the float, wound upon the spool, secured to the detachable member, and normally holding said member in engagement with the spool but adapted, when unwound, to release it from the spool.

4. Apparatus for vessels of the character described including a cable anchoring member fixed to the vessel and having a fixed loop; a reel rotatable in the anchoring member; a cable fixed to and wound on the reel and taking through the fixed loop; a float connected with the cable; a spool mounted on the vessel; a second cable connected with the float and wound on the spool; a movable loop embracing the first mentioned cable; a rod hinged to the loop, and means on the end of the second mentioned cable rotatably connected with the rod.

5. Apparatus for vessels of the character described including a cable anchoring member fixed to the vessel and having a fixed loop; a reel rotatable in the anchoring member; a cable fixed to and wound on the reel and taking through the fixed loop; a float connected with the cable; a spool mounted on the vessel; a second cable connected with the float and wound on the spool; a movable loop embracing the first mentioned cable; a rod hinged to the loop, and a detachable spindle section connected to the end of the second mentioned cable and rotatably connected with the rod.

6. Apparatus for vessels of the character described including a cable anchoring member fixed to the vessel and having a fixed loop; a reel rotatable in the anchoring member; a cable fixed to and wound on the reel and taking through the fixed loop; a float connected with the cable; a spool mounted on the vessel; a second cable connected with the float and wound on the spool; a movable loop embracing the first mentioned cable; a rod hinged to the loop; resilient means on the anchoring member for holding the loop; resilient means on the vessel for holding the rod, and means on the end of the last mentioned cable rotatably connected with the rod.

In testimony whereof I have signed my name to this specification.

JOHN R. DUNCAN.